United States Patent
Sacks

(10) Patent No.: US 10,492,657 B2
(45) Date of Patent: Dec. 3, 2019

(54) WIPE

(71) Applicant: AVET, AG, Rueti/Zurich (CH)

(72) Inventor: Roland Sacks, Cham (CH)

(73) Assignee: AVET AG, Rueti/Zurich (CH)

(*) Notice: Subject to any disclaimer, the term of this patent is extended or adjusted under 35 U.S.C. 154(b) by 185 days.

(21) Appl. No.: 15/547,649

(22) PCT Filed: Feb. 4, 2016

(86) PCT No.: PCT/EP2016/000185
§ 371 (c)(1),
(2) Date: Jul. 31, 2017

(87) PCT Pub. No.: WO2016/124336
PCT Pub. Date: Aug. 11, 2016

(65) Prior Publication Data
US 2018/0020898 A1 Jan. 25, 2018

(30) Foreign Application Priority Data
Feb. 5, 2015 (DE) .................. 10 2015 001 510

(51) Int. Cl.
A47L 13/17 (2006.01)
B32B 5/26 (2006.01)
(Continued)

(52) U.S. Cl.
CPC ............ *A47L 13/17* (2013.01); *B32B 5/022* (2013.01); *B32B 5/06* (2013.01); *B32B 5/10* (2013.01);
(Continued)

(58) Field of Classification Search
CPC .......... A47L 13/17; B32B 5/022; B32B 5/06; B32B 5/10; B32B 5/26; B32B 7/02; B32B 7/08; B32B 2307/726; B32B 2432/00
See application file for complete search history.

(56) References Cited

U.S. PATENT DOCUMENTS 4,239,792 A * 12/1980 Ludwa .................. A47L 13/16
428/198
4,469,734 A * 9/1984 Minto .................... D04H 1/425
156/148
(Continued)

FOREIGN PATENT DOCUMENTS

CN 201094601 8/2008
DE 102010036568 4/2011
(Continued)

*Primary Examiner* — Weilun Lo
(74) *Attorney, Agent, or Firm* — Volpe and Koenig, P.C.

(57) ABSTRACT

The present invention relates to a wiping cloth which is configured so as to be multi-layered and has at least two material layers lying directly on top of one another, of which one first outer material layer forms an external wiping and cleaning layer, and of which the second material layer is configured as a storage layer. In order for such a wiping cloth which by way of a fixedly established surface facilitates a consistent application of cleaning liquid to be achieved, it is provided according to the invention that the at least two material layers lying on top of one another are made from a textile material preferably of at least approximately identical absorbency or water-release capability, in that the wiping and cleaning layer and the storage layer are mechanically interconnected in a planer manner, and in that a cleaning agent that is reactivatable by adding water is provided in at least one of the material layers lying on top of one another.

14 Claims, 1 Drawing Sheet

(51) Int. Cl.
  *B32B 7/02*    (2019.01)
  *B32B 7/08*    (2019.01)
  *B32B 5/02*    (2006.01)
  *B32B 5/06*    (2006.01)
  *B32B 5/10*    (2006.01)

(52) U.S. Cl.
  CPC .................. *B32B 5/26* (2013.01); *B32B 7/02* (2013.01); *B32B 7/08* (2013.01); *B32B 2307/726* (2013.01); *B32B 2432/00* (2013.01)

(56) References Cited

U.S. PATENT DOCUMENTS

| | | | | |
|---|---|---|---|---|
| 2003/0104750 A1* | 6/2003 | Kelly | ........................ | A47K 7/02 442/381 |
| 2003/0114069 A1* | 6/2003 | Scheubel | ................. | A47K 7/02 442/388 |
| 2004/0237234 A1* | 12/2004 | Young | ..................... | A47L 13/17 15/104.94 |
| 2005/0106979 A1* | 5/2005 | Scheubel | ................ | A47L 13/16 442/387 |
| 2005/0244211 A1* | 11/2005 | Brunner | .................. | A47L 13/17 401/132 |
| 2006/0270586 A1* | 11/2006 | Jordan, IV | ............... | A47L 13/17 510/439 |
| 2009/0124157 A1* | 5/2009 | Garza | ..................... | A47L 13/17 442/370 |
| 2009/0286437 A1 | 11/2009 | Cunningham et al. | | |
| 2010/0175209 A1 | 7/2010 | Gormley et al. | | |
| 2010/0203306 A1 | 8/2010 | Fingal et al. | | |
| 2011/0108061 A1* | 5/2011 | Squeri | ..................... | A47L 13/17 134/6 |
| 2013/0227805 A1* | 9/2013 | Maharaj | .................. | A47L 13/16 15/118 |
| 2014/0109333 A1* | 4/2014 | Gummow | ............... | A47L 13/17 15/104.93 |

FOREIGN PATENT DOCUMENTS

| | | |
|---|---|---|
| EP | 2502534 | 9/2012 |
| WO | 9307323 | 4/1993 |
| WO | 03043480 | 5/2003 |
| WO | 2013171343 | 11/2013 |

* cited by examiner

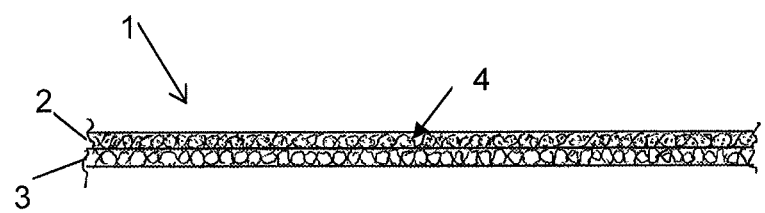

WIPE

BACKGROUND

The invention relates to a wiping cloth which is configured so as to be multi-layered and has at least material layers lying directly on top of one another, of which one first outer material layer forms an external wiping and cleaning layer, and of which at least one second material layer is designed as a storage layer, wherein a cleaning agent is provided in the wiping cloth, and wherein the cleaning agent is configured as cleaning agent that is reactivatable by adding water and so as to lie in at least one of the material layers lying on top of one another.

Wiping cloths for the type mentioned at the outset are used in order to clean wall and in particular floor surfaces with the aid of a cleaning agent, for example. Such wiping cloths are in most instances configured so as to be multi-layered and a wiping and or cleaning face that is intended for impinging the surface to be cleaned, on which face a storage layer bears which receives the cleaning water that is provided for cleaning and in most instances is penetrated by a cleaning agent and successively releases the latter on said wiping and cleaning face. On the periphery, these two material layers lying on top of one another can be sewn to a woven cover fabric which is releasably fastened to a mop holder that serves as a handling means, said woven cover fabric to this end having a hook-and-pile capable surface structure or lateral holding tabs.

Due to the material layers lying on top of one another being sewn on the peripheries in the case of the previously known wiping cloths, and due to the dissimilar properties of the various material layers that are intercombined to form a wiping cloth, there is the problem of no uniform application of a cleaning agent and no uniform cleaning result across the surface to the cleaned being guaranteed by these wiping cloths.

However, it would be desirable, specifically in buildings in which high hygienic requirements are set, for a consistent cleaning result to be able to be expected in any case across a surface that is fixedly established depending on the wiping cloth and on the cleaning liquid stored therein.

A wiping cloth of the type mentioned at the outset is known from US 2009/286437 A1, said wiping cloth being made in the form of sheets from a fibrous material. Microcapsules which are capable of being burst open and which are filled with a cleaning agent are provided in the known wiping cloth. To the extent that the known wiping cloth is designed so as to be multi-layered, these microcapsules can be disposed between a first and a second material layer. By adding water, the microcapsules that accommodate the cleaning agent therein become soft and burst open in an accordingly easy manner, wherein the cleaning liquid is transferred from these microcapsules that have been burst open into the fibrous material of the known wiping cloth.

In the case of the wiping cloth known from US 2009/286437 A1, the required cleaning agent is encapsulated in microcapsules. The cleaning agent is not reactivated by adding water; rather, the microcapsules become soft in such a manner that they may easily burst and release the cleaning liquid. However, it is disadvantageous that the material that is required as the capsule wall for the microcapsules must not have any cleaning effect per se and by forming stripes and streaks can even compromise the visual impact of cleaning. Since the microcapsules are sensitive to pressure and can also burst open prematurely, the known wiping cloth prior to the use thereof and in particular also during the manufacturing thereof cannot be subjected to high mechanical stress.

A wiping cloth which is intended for use as a cleaning cloth for a floor mopping apparatus is already known from DE 10 2010 036 568 A1. The known wiping cloth is constructed so as to be multi-layered and has a storage tier and a cleaning tier. This cleaning tier is functionally connected to a backing tier. While the cleaning tier is designed so as to be sufficiently robust in order to ensure a long service life of the known wiping cloth even on different floors, the storage tier is intended to ensure a controlled absorption of liquid and to guarantee that no liquid exits the cleaning cloth in an uncontrolled manner when the known wiping cloth is being fastened to the floor mopping apparatus. During the operation of the floor mopping apparatus, the storage tier releases the liquid to the cleaning tier in a uniform manner. Since the backing layer as compared to the storage unit has a lower permeability to liquid, the backing tier can act in an advantageously decelerating manner on the release of fluid between the storage tier and the cleaning tier.

In the case of the wiping cloth known from DE 2010 036 568 A1, the release of the cleaning fluid to the surface to be cleaned depends on how much the known wiping cloth has been soaked in the cleaning fluid by the cleaning personnel. By contrast, a precisely metered absorption of cleaning liquid and a controlled release of the cleaning liquid during the wiping procedure is neither possible nor envisaged.

A washable and reusable cleaning cloth which is loaded with a cleaning agent even in the dry state, wherein the cleaning agent that is contained in the dry cleaning cloth can be reactivated by adding water, is known from EP 2 502 534 A1. However, a multi-layered design embodiment of the known cleaning cloth is not provided in EP 2 502 534 A1.

A dish-washing cloth which has a first layer from a non-woven water-repellant material, said first layer being connected to a second material layer which on the surface carries a cleaning paste having a surfactant and said second material layer on that flat side thereof that faces away from the first layer has a fused layer of abrasive neps or hooks, is already known from WO 03/043480 A1.

The known dish-washing cloth which is not made from a textile material can replace a cleaning sponge. On account of the partially even very abrasive surface, the known dish-washing cloth can also release heavy contaminations. However, the known dish-washing cloth is not intended for applying a cleaning agent in a planar manner to floors or walls.

A microfiber cleaning cloth which is composed of a plurality of tiers from an elastic material and a non-elastic material and is distinguished by an enhanced absorbency in the stretched state is already known from WO 93/07323 A1. However, this known microfiber cleaning cloth is also not composed of a textile material and is neither envisaged nor suitable as a wiping cloth for a floor mopping apparatus.

A cleaning cloth which is intended for use as a disposable cloth is intended for the once-only cleaning of hard surfaces is already known from WO 2013/171343 A2. The known cleaning cloth has a paper tier which is connected to a fibrous tier which contains microcapsules. A cleaning agent is located in these microcapsules. Since the known cleaning cloth is not made from a textile material, the former is neither envisaged nor suitable for multiple use. Since the cleaning agent is encapsulated in microcapsules, this cleaning cloth is not capable of unlimited mechanical stress without the cleaning agent unintentionally exiting the microcapsules.

SUMMARY

There is therefore the object to in particular achieve a wiping cloth of the type mentioned at the outset that facilitates a consistent application of cleaning liquid across a fixedly established surface.

This object in the case of the wiping cloth of the type mentioned at the outset is achieved according to the invention in that a fixedly established quantity of a drying-capable cleaning agent that is activatable by adding water is incorporated into the wiping cloth by the manufacturer, and in that the wiping and cleaning layer and the at least one storage layer are mechanically interconnected in a planar manner by driving fiber strand portions of the one material layer into the neighboring material layer in a planar distributed manner.

BRIEF DESCRIPTION OF THE DRAWINGS

The sole FIGURE is a schematic view of the wiping cloth according to the invention.

DETAILED DESCRIPTION

The wiping cloth 1 according to the invention is configured so as to be multi-layered as represented schematically in the FIGURE. At least two material layers 2, 3 of the material layers of the wiping cloth according to the invention lie directly on top of one another. Of these two material layers lying directly on top of one another, one outer material layer 2 forms an external wiping and cleaning layer, while at least one second material layer 3 is configured as a storage layer. The at least two material layers 2, 3 lying on top of one another are made from a textile material. In order for the transportation of the cleaning liquid in the wiping cloth 1 according to the invention to be guaranteed, the wiping and cleaning layer 2, on the one hand, and the at least one storage layer 3 lying directly thereupon, on the other hand, are mechanically interconnected in a planar manner. A merely punctiform contact between these material layers 2, 3 that impedes the uniform transportation of liquid in the wiping cloth is avoided on account of the planar connection of these material layers. Uniform transportation of the cleaning liquid is facilitated since the material layers 2, 3 are made from a textile material. A cleaning agent 4, schematically represented with stippling in the FIGURE, which is reactivatable by adding water is provided in at least one of the material layers 2, 3, preferably in at least the wiping or cleaning layer 2. During the manufacturing of the wiping cloth 1 according to the invention, a fixedly established quantity of a drying-capable cleaning agent 4 that is reactivatable by adding water can be incorporated into the wiping cloth according to the invention by the manufacturer. The wiping cloth 1 according to the invention is prepared so as to be ready for use by simply adding a preferably likewise fixedly established quantity of water at the site of the surface to the cleaned, wherein wiping cloths 1 that are made and prepared in the same way are distinguished by consistent properties and cleaning results.

In order for the planar transportation of liquid in the two material layers 2, 3 of the multi-layered wiping cloth 1 that lie on top of one another to be facilitated, it is provided according to the invention that the wiping and cleaning layer and the at least one storage layer are mechanically interconnected in a planar manner by driving fiber strand portions of the one material layer into the neighboring material layer in a planar distributed manner. By driving through these material layers 2, 3 of the multi-layered wiping cloth 1 that lie on top of one another in the manner of needling, the fiber strand portions in the one material layer are driven into the preferably felted neighboring material layer, where the fiber strand portions of the two material layers lying on top of one another are interlaced. On account of this interlacing of the material strand portions that are provided in the neighboring material layers 2, 3, the material layers 2, 3 lying on top of one another on account of the fiber strand portions of the textile material layers that practically project in the manner of a wick into the respective other material layer are interconnected in such a manner that a good transportation of liquid between these material layers 2, 3 is facilitated. The driving-through of the fiber strand portions in the manner of needling herein can be performed only from the one layer 2, 3 into the other material layer 3, 2, however, it is also possible for the material layers lying on top of one another to be processed in the manner of needling from the one material layer 2, 3 as well as from the other material layer 3, 2.

In order for the wiping and cleaning layer 2 to be adequately penetrated by moisture, it is advantageous for said wiping or cleaning layer 2 to have an absorbency or water-release capability which is approximately equal to or slightly higher than that of the at least one storage layer 3.

However, in order for uniform transportation of the cleaning liquid in the wiping cloth 1 according to the invention to yet be additionally facilitated, one refinement according to the invention provides that the at least two material layers 2, 3 lying on top of one another are made from textile materials having at least approximately identical absorbency or water-release capabilities. Essentially identical absorbency or water-release capabilities herein are to be understood to be absorbency or water-release capabilities of the material layers lying directly on top of one another that vary at the most by ±15 percent.

One preferred embodiment of the invention herein provides that the at least two material layers 2, 3 of the multi-layered wiping cloth 1 that lie on top of one another are made as a mechanically compacted felt. Such felt layers can be particularly well interconnected in a planar manner and are distinguished by a higher water storage capability.

In order for the wiping cloth 1 according to the invention to be able to be used multiple times, even in the case of heavy wear and tear, it is expedient for the material layers 2, 3 to be made from a microfiber, in particular from a polyamide or polyester fiber. In particular, a wiping cloth 1 according to the invention of which the wiping and cleaning layer 2 and of which the at least one storage layer 3 are made from a microfiber is distinguished by a particularly positive cleaning effect.

In order for the wiping cloth 1 according to the invention to be able to receive the cleaning agent 4 required and subsequently also the cleaning liquid that is required for activating the cleaning agent, one preferred refinement according to the invention provides that a solubilizer is provided in at least one material layer 2, 3, said solubilizer enhancing the affinity to anionic groups in this at least one material layer. Such an at least one material layer 2, 3 of which the affinity to anionic groups has been enhanced is capable of receiving in comparatively large amounts in particular such cleaning agents which are constructed from charged components.

One preferred refinement of the invention herein provides that the solubilizer is an ester compound, preferably a phosphoric ester, and in particular an organo-phosphoric acid ester.

In order for the wiping cloth 1 according to the invention to attain a particularly high cleaning effect, and in order for this high cleaning effect to be able to be attained across a comparatively large fixedly established surface, it is expedient for the solubilizer to be provided in the cleaning layer 2.

One preferred refinement according to the invention provides that the wiping cloth 1 has two flat sides of which only one flat side of the wiping cloth is designed as an external wiping and cleaning layer 2. This external wiping and cleaning layer 2 is assigned at least one second material layer 3 as a storage layer.

The wiping cloth 1 according to the invention can also be provided for manual use, for example. However, one preferred embodiment according to the invention provides that the wiping cloth 1 on that flat side thereof that faces away from the wiping and cleaning layer 2 has a hook-and-pile capable surface and/or holding tabs that for fastening the wiping cloth 1 to a mop holder of a wiping mop are preferably disposed on mutually opposite peripheral regions.

One embodiment of the invention that is particularly simple and easily manufacturable provides that the wiping and cleaning layer 2 and the at least one assigned storage layer 3 are mechanically interconnected by driving fiber strand portions of the one material layer into the preferably felted neighboring material layer(s) in a planar distributed manner.

The wiping cloth 1 according to the invention is distinguished in particular by defined cleaning properties, even when only one of the two wiping flat sides is provided as the wiping and cleaning layer 2.

The invention claimed is:

1. A multi-layered wiping cloth, comprising at least first and second material layers lying directly on top of one another, of which the first material layer forms an external wiping and cleaning layer, and of which at least the second material layer is configured as a storage layer, a cleaning agent is provided in the wiping cloth, and the cleaning agent is configured as cleaning agent that is reactivatable by adding water and located so as to lie in at least one of the material layers lying on top of one another, the cleaning agent including a fixedly established quantity of a drying-capable cleaning agent that is activatable by adding water incorporated into the at least one of the material layers by a manufacturer, and the external wiping and cleaning layer and the at least one storage layer are mechanically interconnected in a planar manner by driving fiber strand portions of one of the first or second material layers into a neighboring one of the material layers in a planar distributed manner.

2. The wiping cloth as claimed in claim 1, wherein the wiping and cleaning layer has an absorbency or a water-release capability which is approximately equal to or slightly higher than an absorbency or a water-release capability of the at least one storage layer.

3. The wiping cloth as claimed in claim 1, wherein the at least first and second material layers lying on top of one another are made from textile materials having at least approximately identical absorbency or water-release capabilities.

4. The wiping cloth as claimed in claim 1, wherein at least two of the at least first and second material layers lying on top of one another are made as a mechanically compacted felt.

5. The wiping cloth as claimed in claim 1, wherein at least two of the at least first and second material layers lying on top of one another are made from a microfiber.

6. The wiping cloth as claimed in claim 1, further comprising a solubilizer in at least one of the at least first and second material layers, said solubilizer enhancing an affinity to anionic groups in said material layer.

7. The wiping cloth as claimed in claim 6, wherein the solubilizer is an ester compound.

8. The wiping cloth as claimed in claim 7, wherein the solubilizer is provided in at least the wiping and cleaning layer.

9. The wiping cloth as claimed in claim 1, wherein the wiping cloth has two flat sides of which only one of the flat sides of the wiping cloth is designed as the external wiping and cleaning layer.

10. The wiping cloth as claimed in claim 9, wherein the wiping cloth on said flat side thereof that faces away from the wiping and cleaning layer has at least one of a hook-and-pile capable surface or holding tabs disposed on mutually opposite peripheral regions adapted for fastening the wiping cloth to a mop holder of a wiping mop.

11. The wiping cloth as claimed in claim 10 the wiping and cleaning layer and the at least one assigned storage layer are mechanically interconnected by driving the fiber strand portions of the one of the at least first or second material layers into the neighboring one of the at least first or second material layers in a planar distributed manner.

12. The wiping cloth as claimed in claim 2, wherein only one of two wiping-cloth flat sides of the wiping cloth is configured as the wiping and cleaning layer.

13. The wiping cloth as claimed in claim 5, wherein the microfiber is made from a polyamide fiber or polyester fiber, or from a mixture of polyamide and polyester fibers.

14. The wiping cloth as claimed in claim 7, wherein the ester compound is a polyester or an organo-phosphoric acid ester.

* * * * *